(12) United States Patent
Wang et al.

(10) Patent No.: US 10,597,563 B2
(45) Date of Patent: Mar. 24, 2020

(54) LAMINATES MADE USING HOT MELT ADHESIVES BASED ON A BLEND OF PROPYLENE POLYMERS MADE USING SINGLE-SITE CATALYSTS

(71) Applicant: Bostik, Inc., Wauwatosa, WI (US)

(72) Inventors: Baoyu Wang, Waukesha, WI (US); Kelley Gerschke, Brookfield, WI (US); Terhi I. Hawkins, Milwaukee, WI (US); Charley Paul, Brown Deer, WI (US); Kimberly E. Secrist, Wauwatosa, WI (US)

(73) Assignee: BOSTIK, INC., Wauwatosa, WI (US)

( * ) Notice: Subject to any disclaimer, the term of this patent is extended or adjusted under 35 U.S.C. 154(b) by 0 days.

(21) Appl. No.: 16/243,254

(22) Filed: Jan. 9, 2019

(65) Prior Publication Data

US 2019/0233686 A1    Aug. 1, 2019

Related U.S. Application Data

(62) Division of application No. 15/958,086, filed on Apr. 20, 2018, now Pat. No. 10,214,665, which is a division of application No. 15/405,823, filed on Jan. 13, 2017, now Pat. No. 10,011,744.

(60) Provisional application No. 62/331,829, filed on May 6, 2016, provisional application No. 62/278,747, filed on Jan. 14, 2016.

(51) Int. Cl.
*C08J 11/06* (2006.01)
*C09J 123/14* (2006.01)
(Continued)

(52) U.S. Cl.
CPC .............. *C09J 123/142* (2013.01); *B32B 3/04* (2013.01); *B32B 5/022* (2013.01); *B32B 5/04* (2013.01); *B32B 5/26* (2013.01); *B32B 7/12* (2013.01); *B32B 27/12* (2013.01); *B32B 27/32* (2013.01); *B32B 37/1207* (2013.01); *C08L 23/142* (2013.01); *C09J 11/06* (2013.01); *B32B 2037/1215* (2013.01); *B32B 2250/02* (2013.01); *B32B 2250/03* (2013.01); *B32B 2255/02* (2013.01); *B32B 2255/26* (2013.01); *B32B 2305/18* (2013.01); *B32B 2307/308* (2013.01); *B32B 2307/50* (2013.01); *B32B 2307/51* (2013.01); *B32B 2307/54* (2013.01); *B32B 2307/542* (2013.01); *B32B 2307/546* (2013.01); *B32B 2307/548* (2013.01); *B32B 2307/558* (2013.01); *B32B 2307/58* (2013.01); *B32B 2307/702* (2013.01); *B32B 2307/704* (2013.01); *B32B 2307/718* (2013.01); *B32B 2307/72* (2013.01); *B32B 2323/04* (2013.01); *B32B 2437/00* (2013.01); *B32B 2519/00* (2013.01); *B32B 2535/00* (2013.01);
(Continued)

(58) Field of Classification Search
CPC ......... B32B 37/1207; B32B 5/26; B32B 7/12; B32B 3/04; B32B 27/32; B32B 5/022; B32B 27/12; B32B 5/04; B32B 2307/548; B32B 2250/02; B32B 2255/02; B32B 2307/308; B32B 2307/50; B32B 2307/54; B32B 2307/542; B32B 2307/546; B32B 2307/558; B32B 2307/58; B32B 2307/702; B32B 2307/704; B32B 2307/718; B32B 2307/72; B32B 2519/00; B32B 2535/00; B32B 2553/00; B32B 2555/02; B32B 2581/00; B32B 2037/1215; B32B 2305/18; B32B 2307/51; B32B 2323/04; B32B 2437/00; C08L 23/142; C08L 2314/06; C09J 123/142; C09J 11/06
See application file for complete search history.

(56) References Cited

U.S. PATENT DOCUMENTS 4,022,728 A    5/1977    Trotter et al.
4,120,916 A    10/1978   Meyer, Jr. et al.
(Continued)

FOREIGN PATENT DOCUMENTS

JP    4236288        8/1992
JP    2009/057397    3/2009
(Continued)

OTHER PUBLICATIONS

H.B. Fuller Company, Duty of Candor Under 37 CFR 1.58, A Disposable Absorbent Article and a Method for Making the Same, May 2012-May 29, 2013, as cited in U.S. Appl. No. 14/290,420, on Nov. 22, 2016.
(Continued)

*Primary Examiner* — Nathan M Nutter
(74) *Attorney, Agent, or Firm* — Christopher R. Lewis

(57) ABSTRACT

A laminate comprises a primary substrate and a secondary substrate mated with the primary substrate through contact with a hot melt adhesive. The hot melt adhesive comprises a polymer blend based on a low molecular weight semicrystalline propylene based polymer and a high molecular weight essentially amorphous propylene based polymer, both of which are prepared by using single-site catalysts. The composition further contains a compatible tackifier, a plasticizer, an antioxidant, and optionally a wax, a filler, a colorant, a UV absorber, another polymer, or combinations thereof. Particularly preferred applications include nonwoven disposable diaper and feminine sanitary napkin construction, diaper and adult incontinent brief elastic attachment, diaper and napkin core stabilization, diaper backsheet lamination, industrial filter material conversion, and surgical gown and surgical drape assemblies.

13 Claims, No Drawings

(51) Int. Cl.

| | | |
|---|---|---|
| *C09J 11/06* | (2006.01) | |
| *B32B 27/32* | (2006.01) | |
| *B32B 5/02* | (2006.01) | |
| *B32B 27/12* | (2006.01) | |
| *C08L 23/14* | (2006.01) | |
| *B32B 5/04* | (2006.01) | |
| *B32B 5/26* | (2006.01) | |
| *B32B 7/12* | (2006.01) | |
| *B32B 3/04* | (2006.01) | |
| *B32B 37/12* | (2006.01) | |

(52) U.S. Cl.
CPC ....... *B32B 2553/00* (2013.01); *B32B 2555/02* (2013.01); *B32B 2581/00* (2013.01); *C08L 2314/06* (2013.01)

(56) References Cited

U.S. PATENT DOCUMENTS

| | | | |
|---|---|---|---|
| 4,761,450 A | 8/1988 | Lakshmanan et al. | |
| 5,149,741 A | 9/1992 | Alper et al. | |
| 5,190,606 A | 3/1993 | Merkatoris et al. | |
| 5,387,208 A | 2/1995 | Asthon et al. | |
| 5,512,625 A | 4/1996 | Butterbach et al. | |
| 5,723,546 A | 3/1998 | Sustic | |
| 5,747,573 A | 5/1998 | Ryan | |
| 6,143,818 A | 11/2000 | Wang et al. | |
| 6,329,468 B1 | 12/2001 | Wang | |
| 6,486,246 B1 | 11/2002 | Vion | |
| 6,657,009 B2 | 12/2003 | Zhou | |
| 7,262,251 B2 | 8/2007 | Kanderski et al. | |
| 8,076,407 B2 | 12/2011 | Ellis et al. | |
| 8,366,865 B2 | 2/2013 | Terfloth et al. | |
| 8,383,731 B2 | 2/2013 | Lewtas et al. | |
| 9,000,079 B2 | 4/2015 | Hu et al. | |
| 9,109,143 B2 | 8/2015 | Tse et al. | |
| 9,193,891 B2 | 11/2015 | Hu et al. | |
| 9,359,535 B2 | 6/2016 | Coffey et al. | |
| 9,546,304 B2 | 1/2017 | Hu et al. | |
| 2002/0123726 A1 | 9/2002 | Zhou et al. | |
| 2003/0096896 A1 | 5/2003 | Wang et al. | |
| 2004/0115456 A1 | 6/2004 | Kanderski et al. | |
| 2004/0127614 A1 | 7/2004 | Jiang et al. | |
| 2005/0130544 A1* | 6/2005 | Cheng et al. | B32B 5/022 442/415 |
| 2007/0021566 A1 | 1/2007 | Tse et al. | |
| 2007/0142801 A1 | 6/2007 | Zhou et al. | |
| 2009/0105407 A1 | 4/2009 | Karjala et al. | |
| 2010/0029851 A9 | 2/2010 | Jiang et al. | |
| 2011/0021103 A1 | 1/2011 | Alper et al. | |
| 2012/0328805 A1 | 2/2012 | Davis | |
| 2012/0178333 A1 | 7/2012 | Fowler et al. | |
| 2012/0329353 A1 | 12/2012 | Davis et al. | |
| 2014/0147669 A1 | 5/2014 | Thatcher et al. | |
| 2014/0350155 A1 | 11/2014 | Hamann et al. | |
| 2014/0358100 A1 | 12/2014 | Remmers et al. | |
| 2015/0322302 A1 | 11/2015 | Hu et al. | |
| 2016/0121014 A1 | 5/2016 | Remmers et al. | |
| 2016/0177142 A1 | 6/2016 | Schroeyers et al. | |
| 2016/0270987 A1 | 9/2016 | Stiehl et al. | |
| 2016/0376478 A1 | 12/2016 | Austin et al. | |
| 2017/0058153 A1 | 3/2017 | Schroeyers et al. | |
| 2017/0058155 A1 | 3/2017 | Austin et al. | |
| 2017/0073556 A1 | 3/2017 | Tripathy et al. | |
| 2017/0290945 A1 | 10/2017 | Hanson et al. | |

FOREIGN PATENT DOCUMENTS

| | | |
|---|---|---|
| JP | 2016/155916 | 9/2016 |
| WO | 9914261 A1 | 3/1999 |
| WO | 02053378 A2 | 7/2002 |
| WO | 2011025587 A1 | 3/2011 |
| WO | 2012129489 A2 | 9/2012 |
| WO | 2013039261 A1 | 3/2013 |
| WO | 2013039263 A1 | 3/2013 |
| WO | 2014014491 A1 | 1/2014 |
| WO | 2014130180 A1 | 8/2014 |
| WO | WO 2014194074 | 12/2014 |
| WO | WO 2015/146845 | 10/2015 |
| WO | WO 2016/104539 | 6/2016 |
| WO | WO 2017/177164 | 10/2017 |
| WO | WO 2018/007451 | 1/2018 |
| WO | WO 2018/027055 | 2/2018 |

OTHER PUBLICATIONS

Eastman Brochure, Adhesives and sealants raw materials GPC molecular weight determinations of Eastoflex amorphous polyolefins, 2013, 4 pages.

Eastman Technical Data Sheet, Eastoflex E1200 Amorphous Polyolefin, 2019, 2 pages.

Eastman Technical Data Sheet, Eastoflex P1010 Amorphous Polyolefin, 2019, 2 pages.

* cited by examiner

LAMINATES MADE USING HOT MELT ADHESIVES BASED ON A BLEND OF PROPYLENE POLYMERS MADE USING SINGLE-SITE CATALYSTS

CROSS-REFERENCE TO RELATED APPLICATIONS

This application is a continuation application under 35 U.S.C. § 120 of U.S. patent application Ser. No. 15/958,086, filed on Apr. 20, 2018, which is a divisional application under 35 U.S.C. § 121 of U.S. patent application Ser. No. 15/405,823, filed on Jan. 13, 2017, and now U.S. Pat. No. 10,011,744, which claims priority under 35 U.S.C. § 119(e) to U.S. Patent Application Nos. 62/278,747, filed Jan. 14, 2016, and (2) U.S. Application No. 62/332,829, filed May 6, 2016.

FIELD OF THE INVENTION

This invention relates to a novel hot melt adhesive composition based on a polymer blend comprising polypropylene polymers prepared by using single-site catalysts. More particularly, the polypropylene polymer blend comprises a low molecular weight semicrystalline propylene polymer and a high molecular weight essentially amorphous propylene polymer, thereby producing a polymer component having a bimodal molecular weight distribution. The adhesive composition has well-balanced adhesion and cohesion properties and finds utility in packaging, product assembly and laminations. The adhesive composition is particularly useful in bonding low surface energy substrates that are often seen in manufacturing a variety of disposable nonwovens hygienic products such as baby diapers, adult incontinent articles and feminine hygiene pads.

BACKGROUND OF THE INVENTION

Hot melt adhesives typically exist as a solid mass at ambient temperature and can be converted to a flowable liquid by the application of heat. These adhesives are particularly useful in manufacturing a variety of disposable goods where bonding of various substrates is often necessary. Specific applications include disposable diapers, hospital pads, feminine sanitary napkins, panty shields, surgical drapes and adult incontinent briefs, collectively known as disposable nonwoven hygienic products. Other diversified applications have involved paper products, packaging materials, automotive headliners, appliances, tapes and labels. In most of these applications, the hot melt adhesive is heated to its molten state and then applied to a substrate, often named as the primary substrate. A second substrate, often named as the secondary substrate, is then immediately brought into contact with and compressed against the first. The adhesive solidifies on cooling to form a strong bond. The major advantage of hot melt adhesives is the absence of a liquid carrier, as would be the case of water or solvent based adhesives, thereby eliminating the costly process associated with solvent removal.

For many applications, hot melt adhesives are often extruded directly onto a substrate in the form of a thin film or a bead by using piston or gear pump equipment. In this case, the substrate is brought into intimate contact with a hot die under pressure. The temperature of the die must be maintained well above the melting point of the adhesive to allow the molten hot melt material to flow through the application nozzle smoothly. For most applications, particularly those encountered in food packaging and disposable nonwovens hygienic article manufacturing, bonding of delicate and heat sensitive substrates, such as thin gauge plastic films, is often involved. This imposes an upper limit on coating temperature for hot melt adhesive applications. Today's commercial hot melts are typically formulated to have coating temperature below 200° C., preferably below 150° C., to avoid substrate burning or distortion. Besides directly coating, several indirect or noncontact coating methods, through which a hot melt adhesive can be spray coated with the aid of compressed air onto a substrate from a distance, are also developed. These non-contact coating techniques include conventional spiral spray, Omega™, Surewrap™ and various forms of melt-blown methods. The indirect method, however, requires that the viscosity of the adhesives must be sufficiently low, usually in the range of 2,000 to 30,000 mPa·s, preferably in the range of 2,000 to 15,000 mPa·s, at the application temperature in order to obtain an acceptable coating pattern. Many other physical factors, especially the rheological properties of the adhesive, come into play in determining the sprayability of a hot melt. The majority of commercial hot melt products do not lend themselves to spray applications. There are no accepted theoretical models or guidelines to predict sprayability, which must be determined empirically with application equipment.

Hot melt adhesives are organic materials typically consisting of a polymer, a plasticizer, a tackifying resin, and an antioxidant package. Other ingredients, such as wax, filler, colorant and UV absorber, can also be used to modify the adhesive properties or to provide special attributes. These organic ingredients are prone to heat degradation under the coating conditions of the adhesive. For example, the widely used commercial hot melt adhesive based on styrene-isoprene-styrene (SIS) triblock copolymer, when subjected to 175° C. for 24 hours, can suffer from a viscosity drop of about 50 percent from its original value. A styrene-butadiene-styrene (SBS) based hot melt may cause problems by crosslinking under similar conditions. Crosslinking can result in a dramatic increase in viscosity and may eventually render the adhesive un-flowable by the formation of three dimensional polymer network. The viscosity change is often accompanied by charring, gelling, and formation of skin on top of the molten material. The degradation will inevitably lead to deterioration of the adhesive properties and performance. In addition, they can also cause equipment damage. The rate of degradation is temperature dependent; the higher the temperature, the faster the degradation. Thus, reducing the coating temperature of the adhesive can slow down degradation.

Conventional polyolefins produced by using Ziegler-Natta (ZN) catalysts such as, for example, low density polyethylene (LDPE), high density polyethylene (HDPE), and istotatic polypropylene (iPP) do not lend themselves to adhesive applications. Ziegler-Natta (ZN) catalyst systems consist of a pair of catalyst and co-catalyst. The most common of such pairs are $TiCl_3$ and $Al(C_2H_5)_2Cl$, or $TiCl_4$ with $Al(C_2H_5)_3$. Ziegler-Natta catalyst systems are a subject of numerous publications in scientific journals and textbooks and are well known to those skilled in the art. A conventional ZN catalyst system is typically embedded in an inert support and has several catalyst sites, each of which has different activity. This difference in activity causes the formation of polymer molecules with a plurality of molecular weights and composition of copolymer molecules. The polyolefin homopolymers and copolymers produced with ZN catalysts are typically highly crystalline and stiff. This can translate to a hot melt adhesive that is relatively brittle or has poor substrate wetting, poor adhesion, and poor processibility. Nevertheless, hot melt adhesives containing various types of polyolefin blends are known in various previous patent literatures.

As used herein, Z-N refers to a Ziegler-Natta catalyst for olefin polymerization.

As used herein, LDPE and HPDE refer to low density polyethylene and high density polyethylene, respectively.

As used herein, iPP refers to isotactic propylene homopolymers or copolymers having predominantly an isotactic chain structure.

As used herein, amporphous poly-alpha-olefin (APAO) refers to a class of low molecular weight amorphous propylene homopolymers or copolymers with ethylene or butene typically produced with a Lewis acid catalyst.

As used herein, PB refers to polybutene homopolymers and copolymers.

For example, Trotter et al, in U.S. Pat. No. 4,022,728, describes a hot melt pressure sensitive composition comprising a mixture of APAOs, a low molecular weight substantially amorphous elastomer, a liquid tackifier, and a conventional crystalline polypropylene (iPP) in the amount of up to 2% by weight. According to the '728 patent, the composition provides good adhesive properties at low temperatures.

Meyer et al, in U.S. Pat. No. 4,120,916, discloses hot melt adhesive compositions comprising a blend of low molecular weight PE, low molecular weight iPP, and APAO. These adhesive compositions are said to offer short open times and to be useful for bonding of paraffin modified corrugated board.

Lakshmanan et al, in U.S. Pat. No. 4,761,450, discloses a polymer blend useful as a hot melt adhesive comprising a LDPE, a copolymer of butene-1 with ethylene or propylene, a hydrocarbon tackifier, and a low molecular weight polymer consisting of a low molecular weight liquid polybutene, an APAO, and mixtures thereof.

Ryan discloses in U.S. Pat. No. 5,747,573 an APAO based hot melt adhesive composition useful for bonding plastics and metallized foil containers. The adhesive composition contains a blend of APAO, a solid benzoate plasticizer, and a hydrocarbon tackifier.

Blending APAO with polyethylene (PE), polybutene (PB) copolymers, or the conventional iPP leads to severe drawbacks. The prior art adhesives containing APAO/PE or APAO/PB blends, such as, for example, those described herein above in U.S. Pat. Nos. 4,120,916 and 4,761,450 tend to have poor compatibility. These adhesives can undergo phase separation during the application process when the hot melt adhesive must be kept in the molten state at high temperature for a prolonged period of time, sometimes for hours or even days. Charring, skinning and gelling can develop rather quickly in the phase separated hot melt adhesives, thereby causing the application equipment to block or plug-up. The incompatibility of such polymer blends also imparts brittleness, optical haziness, poor or no open time, and low bond strength. Although APAO and the conventional iPP blend based hot melts do not have the compatibility problems, they may still suffer from all the other drawbacks herein described above. Moreover, due to high crystallinity and high melting point of the conventional iPP polymers, hot melt adhesives based on APAO/iPP blends tend to be hard and brittle unless the iPP polymer amount is kept at a very low level, such as, for example, at about or below 2% by weight as disclosed in U.S. Pat. No. 4,022,728. As a result, these adhesives will have poor tensile strength, poor bond strength, and poor impact resistance. Another detrimental effect of iPP is the increased coating temperature. The adhesive must be heated well above the melting point of iPP (ranging from 180 to 200° C.) to reach liquid state. Although the blend of high and low molecular weight atactic polyolefin approach described in U.S. Pat. No. 5,723,546 offers some improvement on tensile properties of APAO, it has not been able to provide sufficient tensile strength and high temperature properties to overcome the deficiencies of sole APAO based hot melts.

The shortcomings in the prior art mentioned above are partially overcome in more recent inventions that are disclosed in U.S. Pat. No. 6,329,468, that teaches the use of semicrystalline flexible polyolefin for hot melt adhesive compositions; in U.S. Pat. No. 7,262,251 that teaches a hot melt adhesive composition based on a random copolymer (RCP) of isotactic polypropylene and a secondary polymer; in US Patent Application Publication US2003/0096896 A1 that describes a hot melt composition comprising a blend of syndiotactic polypropylene (sPP) and APAO; in U.S. Pat. No. 8,383,731 that describes an adhesive blend based on a semicrystalline copolymer of propylene with an alpha-olefin. These compositions, however, all consist of a rigid semicrystalline polymer that is non-uniform in either intra-molecular and/or intermolecular compositional distribution, and in the tacticity distribution of molecular chains. It is not the intention of the present invention to dwell on theoretical discussions of polymer property-function relationships, but non-uniformity in the composition and chain structure, coupled with a very broad molecular weight distribution, may be accountable for poor adhesive properties and poor processibility for a hot melt composition. These semicrystalline polymers in the above compositions can have rigid polymer chain structure, which is detrimental to adhesion and application properties of hot melt adhesives containing such polymers. It is extremely difficult, if not impossible, to balance the complex requirements of adhesion, cohesion, low viscosity, broad application temperature range, and applicability by a whole array of application methods.

Most recently, Tse et al in U.S. Pat. No. 9,109,143 revealed an adhesive composition containing a blend of two low molecular weight propylene based copolymers having a weight average molecular weight (Mw) less than 100,000 g/mol. The low molecular weight propylene copolymers of the '143 patent also have low melting point and low crystallinity. The copolymers, primarily directed to sealing of corrugated boxes, have poor cohesive strength and therefore do not lend themselves to an array of demanding applications such as, for example, in elastic attachment for nonwoven hygiene products and auto headliner assembly.

U.S. Patent Application No. 2016/0121014 discloses a disposable absorbent article and an adhesive composition including a first polymer that is propylene-based and has a molecular weight of no greater than about 75,000 and a second polymer selected from a group including propylene based polymers with a molecular weight of at least about 100,000 and styrene block copolymers with a styrene content of no greater than about 20%, where the adhesive composition is alleged to be useful for elastic attachment applications.

SUMMARY OF THE INVENTION

Therefore, it would be advantageous to provide a hot melt adhesive that will overcome the shortcomings of the prior art adhesives mentioned above. It is found in the present invention that a polyolefin polymer blend comprising a semicrystalline low molecular weight, single site catalyst polypropylene-based (LMW SSC-PP) polymer and an essentially amorphous high molecular weight, single site catalyst polypropylene-based (HMW SSC-PP) polymer provides a unique combination of properties which the prior art hot melt systems have failed to offer, thereby providing high bond strength to a variety of low surface energy substrates such as LDPE and iPP films, high cohesive strength to hold elastic materials under constant tension, excellent heat stability, good wet-out property, broad application temperature range, long open time, good green bond strength and suitability with essentially all known hot melt coating methods.

In accordance with the present invention, a hot melt adhesive composition is comprised of a blend of propylene polymers produced using single-site catalysts (SSC); a high molecular weight essentially amorphous polypropylene polymer (HMW SSC-PP polymer) and a low molecular weight semicrystalline polypropylene copolymer (LMW SSC-PP polymer). The distinct molecular weights of the component polymers give rise to a polymer blend having a bimodal molecular weight distribution. Besides the difference in molecular weights, the SSC-PP polymer in the blend also differs in enthalpy of melting, which is an indirect measure of polymer crystallinity. For the purposes of the present invention, the LMW semicrystalline SSC-PP polymer is defined as propylene homo- or co-polymers having a weight average molecular weight (Mw) of 100,000 g/mole or less, a distinct melting point on the DSC curve, and an enthalpy of melting above 30 Joules per gram of material (J/g). The HMW essentially amorphous SSC-PP polymer is defined as propylene homo- or co-polymers having a weight average molecular weight (Mw) above 100,000 g/mole, and containing either no or essentially no crystal phase or a small fraction of residue crystallinity that is characterized by a small, but noticeable melting point on a differential scanning calorimetry (DSC) curve with an enthalpy of melting below 30 Joules per gram of material (J/g). The HMW essentially amorphous SSC-PP polymer may also be completely amorphous showing no melting peak on its DSC curve. The composition also includes a tackifier component, a plasticizer component, an antioxidant package, and optionally other additives such as a wax, a filler, a colorant, a UV absorber, and another polymer. The composition is well suited for applications with a variety of direct and indirect coating methods and has a novel combination of properties including low coating temperature, wide coating temperature range, excellent adhesion to low surface energy plastic substrates, high cohesive strength, high shear resistance, high strand hold property, low viscosity, low melting point and superior heat stability. The composition of the present invention is particularly useful for food packaging, product assembly and for assembly of disposable nonwoven articles for bonding of polyethylene and polypropylene films, nonwoven fabrics and elastic strands to each other or to themselves.

As used herein, SSC refers to single-site catalysts for α-olefin polymerization.

As used herein, Mw refers to weight average molecular weight of a polymer.

For the purposes of the present invention, the term essentially amorphous is used to refer to a state wherein a PP based polymer exhibits an enthalpy of melting from 0 J/g to about 30 J/g.

For the purposes of the present invention, the term semicrystalline is used to refer to a state wherein a PP based polymer exhibits an enthalpy of melting above 30 J/g.

As used herein, HMW SSC-PP refers to a class of high molecular weight essentially amorphous propylene homopolymers or copolymers produced by using single-site catalysts having a Mw greater than about 100,000 g/mole. The polymers can be completely amorphous showing no melting peaks on a DSC curve, but they can also have a small fraction of crystals that give rise on a DSC curve to a small, but noticeable, melting peak or peaks with associated enthalpy of melting of 30 joules per gram of material (J/g), or less, i.e. from 0 J/g to about 30 J/g.

As used herein, DSC curve refers to a plot of heat flow or heat capacity versus temperature obtained by using differential scanning calorimetry (DSC) instrument. The test method used to determine these values is ASTM E793-01 "Standard Test Method for Enthalpies of Fusion and Crystallization by Differential Scanning Calorimetry".

As used herein, LMW SSC-PP refers to a class of low molecular weight semicrystalline propylene homopolymers or copolymers having a weight average molecular weight (Mw) of about 100,000 g/mole or less, and a distinct melting peak or peaks on a DSC curve with associated enthalpy of melting of 30 joules per gram of material (J/g) or greater, i.e. typically from about 30 J/g to about 100 J/g, more preferably from about 30 J/g to about 90 J/g, and most preferably about 35 J/g to about 80 J/g. The terms "enthalpy of melting", "enthalpy of fusion", "heat of fusion" and "heat of melting" are used interchangeably.

As used herein, SSC-PP blend refers to a polymer blend comprising at least one HMW SSC-PP polymer and at least one LMW SSC-PP polymer.

The present invention is, therefore, directed to hot melt adhesive compositions comprising a polypropylene polymer blend containing a semicrystalline LMW SSC-PP polymer and an essentially amorphous HMW SSC-PP polymer with a ratio of the LMW material to the HMW material ranging from 9:1 to 1:9 parts by weight. The adhesive composition comprises, in addition to the SSC-PP blend, a tackifying resin, a plasticizer, and ah antioxidant system as the primary ingredients. The compositions of the present invention have taken advantage of complimentary properties between the semicrystalline LMW SSC-PP polymer and the essentially amorphous HMW SSC-PP polymer and have overcome the shortcomings of the prior art polyolefin based hot melt adhesives. Compositions according to embodiments of the present invention provide well balanced properties of tensile strength, toughness, flexibility and adhesion. They exhibit high bond strength to a variety of low surface energy substrates such as LDPE and iPP films, high cohesive strength to hold elastic materials under constant tension, excellent heat stability, good wet-out properties, broad application temperature range, long open time, good green bond strength, low viscosity, low or no residual tack when set, and suitability with essentially all known hot melt coating methods. In particular, embodiments of the present invention lead to an adhesive composition that is well suited for a variety of spray coating application techniques, such as, for example, spiral spray, Omega™, Surewrap™, melt-blown, Control Coat®, and the like, and non-spray coating application techniques such as, for example, slot coat, V-slot™, Allegro™ and the like; these coating techniques are well known to those skilled in the art and are not a subject of discussion of the present invention.

It is, therefore, an objective of the present invention to provide a hot melt adhesive composition comprising a polymer blend containing at least one semicrystalline LMW SSC-PP polymer and at least one essentially amorphous HMW SSC-PP polymer; both of which are either homopolymers of propylene or copolymers of propylene with an alpha-olefin comonomer prepared by using single-site catalysts (SSC) and have a statistically random comonomer distribution along the polymer chain. The weight ratios of the semicrystalline LMW SSC-PP polymer to the essentially amorphous HMW SSC-PP polymer in the blends ranges from 9:1 to 1:9 and the total amount of the polymer blend in the composition of the present invention is from 20% to 80% by weight, preferably from 30% to 60% by weight and most preferably from 30% to 50% by weight.

The semicrystalline LMW SSC-PP polymer may be present in embodiments of the invention in an amount of between 5% to 50% by weight, more preferably between 10% to 35%, and most preferably between 15% to 30%/c. The essentially amorphous HMW SSC-PP polymer may be present in embodiments of the invention in an amount of between 7% to 35% by weight, more preferably between 10% to 30%, and most preferably between 15% to 28%. When various ranges of any constituent are provided herein, the invention contemplates that the composition may contain a range of that constituent extending from a lower limit of a first range to an upper limit of a second range, e.g., the semicrystalline LMW SSC-PP polymer being present in an amount extending from 5% to 30%. Moreover, as to these two specific constituents, the composition of the invention may contain one disclosed range of the semicrystalline LMW SSC-PP with any of the disclosed ranges of the essentially amorphous HMW SSC-PP polymer, e.g., 5% to 50% by weight of the semicrystalline LMW SSC-PP polymer and 15% to 28% of the essentially amorphous HMW SSC-PP polymer.

Additionally, preferred embodiments of the composition of the present invention comprise essentially amorphous HMW SSC-PP polymer in an amount of 15% to 28%, more preferably from 18% to 28%, still more preferably from 20% to 28%, still more preferably from 22% to 28%, and alternatively, at least 23%, 24%, or 25% up to 50%, 45%, 35%, or any of the upper limits disclosed herein. According to such embodiments, the composition of the present invention comprises the semicrystalline LMW SSC-PP polymer in an amount of 5% to 50% by weight, more preferably between 10% to 35%, and most preferably between 15% to 30%, and alternatively, between 5% to 20%.

A second objective of the present invention is to teach the art of formulating a hot melt adhesive composition containing the polymer blend herein mentioned above in combination with a plasticizer, a compatible tackifier, and antioxidant. The composition can contain optional additives including, but not limited to, a wax, a functionalized polymer, a colorant, an UV absorber, and a filler.

A third objective of the present invention relates to a hot melt composition comprising the polymer blend that has low viscosity ranging from 500 mPa·s to 35,000 mPa·s at 177° C., preferably from 1000 mPa·s to 20,000 mPa·s and most preferably from 2,000 mPa·s to 15,000 mPa·s. Low viscosity is essential for applications involving various spray coating methods.

Another objective of the present invention is to provide a hot melt adhesive composition for nonwoven elastic attachment applications having a creep retention of at least 80% or higher; a value of 80% (based on the methodology described herein) is generally the minimum acceptable by disposable nonwoven hygienic article industry.

The present invention encompasses any application where bonding of similar or dissimilar substrates is involved using a hot melt adhesive at a temperature lower than 200° C., preferably equal to or lower than 160° C. while obtaining good cohesion from the adhesive bond to withstand mechanical stress at low, ambient or elevated temperature, in particular under creep conditions. The present composition is particularly advantageous in bonding printed or coated paperboard having the low surface energy of plastic materials, such as for example, the paper boxes for freezing food packaging, where the boxes are often coated with a moisture barrier material to protect their contents from drying during storage, or printed for aesthetic reasons, or both. For such packaging applications, the present composition allows fiber tear bond strength on coated and printed boxes at low temperatures below the freezing point, where the conventional ethylene vinyl acetate (EVA) hot melts fail to work. It is, therefore, another objective of the present invention to provide a hot melt for low temperature packaging application.

Another objective of the present invention is to teach a method for preparing the hot melt adhesive composition involving a batch process.

Another objective of the present invention is to provide a hot melt adhesive composition that has good processibility at low temperatures, below 160° C., for applications involving heat sensitive substrates which are unavoidably encountered in nonwovens hygiene absorbent article manufacturing, where thin gauge LDPE films and PP nonwovens fabric are typically used.

Another objective is to teach the art of applying the hot melt composition of the present invention by using various hot melt coating methods and to provide a method of bonding or laminating two or more substrates by first applying the hot melt to the primary substrate and subsequently mating the primary substrate to a secondary substrate.

A further objective of the present invention is to provide a hot melt adhesive composition that is particularly useful for various application in manufacturing of nonwovens hygienic absorbent articles including, but not limited to baby diapers, training pants, adult incontinent articles, feminine pads, panty liners, surgical gowns and poultry absorbent pads, the composition having well balanced properties of tensile strength, toughness, flexibility and adhesion. It exhibits high bond strength to a variety of low surface energy substrates such as LDPE and iPP films, high cohesive strength to hold elastic materials, such as elastic strands, under constant tension, excellent heat stability, good wet-out property, broad application temperature range, long open time, good green bond strength, low viscosity, low or no residual tack when set, and suitability with essentially all known hot melt coating methods.

The objectives of the present invention may be achieved by a hot melt adhesive composition comprising as components thereof a mixture of the following ingredients:

a. a polymer blend comprising at least one semicrystalline LMW SSC-PP polymer and at least one essentially amorphous HMW SSC-PP polymer; both of which are either homopolypropylene or copolymers of propylene with an α-olefin comonomer prepared by using SSC catalysts and have a statistically random comonomer distribution along the polymer chain. The weight ratios of the semicrystalline LMW SSC-PP polymer to the essentially amorphous HMW SSC-PP polymer in the blends ranges from 9:1 to 1:9 and the total amount of the polymer blend in the composition of the present invention is from about 20% to about 80% by weight, preferably from about 30% to about 60% by weight and most preferably from about 30% to about 50% by weight; the LMW SSC-PP polymer having a density of about 0.86 g/cc to about 0.90 g/cc at 23° C., a weight average molecular weight from about 10,000 g/mole to about 100,000 g/mole, a melting point from about 20° C. to about 150° C., a melt enthalpy of about 30 J/g to about 100 J/g, a crystallinity of about 18% to about 55% and a melt viscosity from about 800 mPa·s to about 100,000 mPa·s; and the HMW PP copolymer having a density of about 0.85 g/cc to about 0.88 g/cc at 23° C., a weight average molecular weight greater than 100,000 g/mole, either no melting point or a melting point from about 20° C. to about 120° C., a melt enthalpy of about 0 J/g to about 30 J/g, a crystallinity of about 0% to about 18% and a melt flow rate (FMR) of equal to or less than 200 g/10 min. per ASTM D-1238 at 230° C./2.16 kg test conditions;

b. a compatible tackifier in the amount of about 15% by weight to about 75% by weight, preferably in the amount of about 30% by weight to about 60% by weight;

c. about 1% to about 35% by weight, preferably about 2% to about 20% by weight, of a plasticizer;

d. about 0.1% to about 3% by weight, preferably about 0.2% to about 1.0% by weight, of a stabilizer or antioxidant; and e. optionally about 0% to about 20% by weight, preferably about 0% to about 15% by weight, of a wax.

the components of the composition (which may include further additional components) adding up to 100% by weight. The adhesive composition may contain other components such as filler and/or a colorant and/or a fluorescing agent and/or another polymer that can modify the adhesive properties of the above basic adhesive composition.

The objectives of the present invention may also be achieved by a hot melt adhesive composition comprising as components thereof a mixture of the following ingredients:

a. a polymer blend containing at least one semicrystalline LMW SSC-PP polymer and at least one essentially amorphous HMW SSC-PP copolymer; both of which are either homopolypropylene or copolymers of propylene with an α-olefin comonomer prepared by using SSC catalysts; the weight ratio of the LMW SSC-PP polymer to the HMW SSC-PP polymer in the blends ranges from 9:1 to 1:9 and the total amount of the polymer blend in the composition of the present invention is from about 20% to about 80% by weight, preferably from about 30% to about 60% by weight and most preferably from about 30% to about 50% by weight; the LMW SSC-PP having a weight average molecular weight from about 10,000 g/mole to about 100,000 g/mole, a crystallinity of about 18% to about 50%, and a Brookfield viscosity at 190° C. ranging preferably from about 800 mPa·s to about 100,000 mPa·s; and the HMW SSC-PP polymer a weight average molecular weight greater than 100,000 g/mole, and a crystallinity of about 0% to about 18%, wherein the molecular weight of the HMW PP polymer is at least double the molecular weight of the LMW SSC-PP;

b. a compatible tackifier in the amount of about 15% by weight to about 75% by weight, preferably in the amount of about 30% by weight to about 60% by weight;

c. about 1% to about 35% by weight, preferably about 2% to about 20% by weight, of a plasticizer;

d. about 0.1% to about 3% by weight, preferably about 0.2% to about 1.0% by weight, of a stabilizer or antioxidant;

e. optionally about 0% to about 20% by weight, preferably about 0% to about 15% by weight, of a wax.

DETAILED DESCRIPTION OF THE INVENTION

In accordance with the present invention, a hot melt adhesive composition is produced, comprising as the base polymer components a blend of a semicrystalline LMW SSC-PP polymer and an essentially amorphous HMW SSC-PP polymer, both polymers prepared by using single-site catalyst systems, which can be distinguished from conventional Z-N catalyst systems in several ways. Ziegler-Natta catalyst systems typically consist of a pair of catalyst and co-catalyst and the most common of such pairs are $TiCl_3$ and $Al(C_2H_5)_2Cl$, or $TiCl_4$ with $Al(C_2H_5)_3$. Conventional Z-N catalyst systems are typically embedded in an inert support and have several active catalyst sites on a support particle, each of which has different activity. In homopolymerization of α-olefins, the more active sites incorporate more monomer molecules into the polymer backbone, thereby producing polymer molecules having relatively longer chain lengths or higher molecular weight. Conversely, the less active sites will give rise to polymer molecules of shorter chain lengths. The polymers produced by Z-N catalyst will have very broad molecular weight distribution with a poly dispersity index (PDI) up to 10, whereas the polymers prepared by SSC catalysts have narrow molecular weight distribution with a PDI typically from about 2 to about 4. The PDI is defined as the ratio of weight average molecular weight (Mw)/number average molecular weight (Mn). With Z-N catalysts, the polymerization reaction is highly stereospecific. The α-olefin molecules add to the polymer chain only in a particular orientation, depending on the chemical and crystal structure of the catalyst, thereby producing a regular, repeating three-dimensional polymer chain configuration. In polymer scientific nomenclature, the term tacticity is used to describe chain configuration, i.e., the stereo structure of a polymer chain. A polymer is called isotactic if it has a chain configuration described as having the radical groups attached to the tertiary carbon atoms of successive monomeric units on the same side of a hypothetical plane drawn through the main polymer chain.

Polypropylene having this type of chain configuration is known as isotactic polypropylene, or iPP.

A polypropylene chain can also adopt syndiotactic configuration in which the tertiary methyl groups of successive monomer units along the chain are alternatively disposed on each side of the hypothetical plane.

Polypropylene having this type of chain configuration is called syndiotactic polypropylene, or sPP.

In contrast to a regular spatial configuration, a propylene polymer chain can also have a chain stereo structure characterized by having the methyl groups on the successive monomeric units sterically randomly distributed on both sides of the hypothetical plane through the polymer chain. This chain configuration is defined as atactic polypropylene (aPP).

The commercial Z-N catalysts in use today are designed to produce predominantly isotactic chain configuration. This stereo selectivity, however, is not completely sufficient and monomer insertion error can occur, which is characterized by occasional addition of a syndiotactic carbon atom along the predominantly isotactic polymer chain. The error in selectivity results in a local random configurations and disruption of chain regularity, thereby producing certain atactic fraction. This phenomenon accounts for a small, but significant amorphous fraction in iPP polymers. The different active sites on a supported Z-N catalyst mentioned above also exhibit different stereo selectivity, some of the sites being more faithful in producing isotactic configuration than the others. The resulting polypropylene inevitably consists of a complicated heterogeneous series of molecules having different chain lengths and tacticity. Despite the difference in individual molecules, the stereo configuration of polypropylene is, nevertheless, still predominantly isotactic. Because of this structure, polypropylenes macroscopically are a semicrystalline material having a high degree of crystallinity and high melting point.

The molecular structures of copolymers of propylene with other α-olefins produced by Z-N catalysts are even more complex. In addition to molecular weights and tacticity differences herein mentioned above, the copolymer molecules typically also have differences in composition in terms of comonomer contents due to differences in activities on catalyst active sites towards comonomers. This leads to heterogeneous materials consisting of molecules that are different not only in molecular weight and tacticity, but also in comonomer distribution. The comonomer can disrupt chain stereo regularity, thereby reducing crystallinity. From stereochemistry point of view, propylene copolymers by ZN catalysts can be regarded as blocky, having isotactic chain segments or isotactic blocks that are interrupted by atactic chain segments or atactic chain blocks. Driven by thermodynamic forces, the isotatic blocks will aggregate to form crystals having essentially the same melting point as homopolypropylene. In terms of crystal structure, propylene copolymers are basically that of iPPs but having lower crystallinity.

The Z-N type of propylene homo- and co-polymers has not found use in adhesive application due to their high melting point and high crystallinity. The melting point of polypropylene crystals are typically around 165-170° C. This implies that hot melt adhesives containing them will remain solid until the melting point of polypropylene of about 170° C. is reached, at which point the hot melt starts to melt and become liquid. Empirically, it is required that the application temperature of a hot melt adhesive must be 20-30° C. higher that the melting point or softening point of the adhesive. The actual application temperature would have to be at least 200° C. if conventional PP based adhesive did exist. At this temperature, the hot melt can degrade quickly, thereby causing various processing and performance issues.

Single-site catalyst systems (SSC) differ from the conventional Z-N catalysts in at least one significant way. They have only a single active transition metal site for each catalyst molecule and the activity at this metal site is therefore identical for all the catalyst molecules. One type of SSC catalyst that has now been widely used on industrial scale is a metallocene catalyst system consisting of a catalyst and a co-catalyst or activator. The catalyst is a transition metal complex having a metal atom situated between two cyclic organic ligands; the ligands being the same or different derivatives of cyclopentadiene. The co-catalyst can be any compound capable of activating the metallocene catalyst by converting a metallocene complex to a catalytically active species and an example of such compound is alumoxane preferably methylalumoxane having an average degree of oligomerization of from 4-30. For the purpose of this invention, other neutral or ionic activators can be used, including, but not limited to, various organic boron compounds such as tri(n-butyl)ammonium tetrakis(pentafluorophenyl borate, dimethylanilinium tetrakis(pentafluorophenyl borate or trityl tetrakis(pentafluorophenyl borate. Another type of SSC catalyst is the constrained geometry catalyst (CGC).

As used herein, CGC refers to a sub-class of SSC catalyst system known as constrained geometry catalyst. Different from metallocenes, the constrained geometry catalyst (CGC) is characterized by having only one cyclic ligand linked to one of the other ligands on the same metal center in such a way that the angle at this metal between the centroid of the pi-system and the additional ligand is smaller than in comparable unbridged complexes. More specifically, the term CGC is used for ansa-bridged cyclopentadienyl amido complexes, though the definition goes far beyond this class of compounds. Hence, the term CGC is broadly used to refer to other more or less related ligand systems that may or may not be isolobal and/or isoelectronic with the ansa-bridged cyclopentadienyl amido ligand system. Furthermore, the term is frequently used for related complexes with long ansa-bridges that induce no strain.

Like metallocenes, suitable CGCs may be activated methylaluminoxane (MAO), perfluorinated boranes and trityl borates co-catalysts. The catalytic systems based on CGCs, however, display incorporation of higher alpha-olefins to a much larger extend than comparable metallocene based systems. Non-metallocene based SSCs, also referred to as post-metallocene, single-site catalysts for olefin polymerization are also known. Typical post-metallocene catalysts feature bulky, neutral, alpha-diimine ligands. These post-metallocene catalysts, however, are more frequently used for polymerization of ethylene to produce plastomers and elastomers. They are rarely used for polymerization of α-olefins such as propylene. Single-site catalyst systems for olefin polymerization are well known to those skilled in the art and are extensively discussed in two symposia entitled Stereoselective Polymerization with Single-Site Catalysts edited by Lisa S. Baugh and Jo Ann M. Canich published by CRC press (2008), and Polyolefins: 50 Years after Ziegler and Natta II: Polyolefins by Metallocenes and Other Single-Site Catalysts edited by Walter Kaminsky and published by Springer Heidelberg (2013).

The advancement of SSC catalyst systems herein discussed above has made it practical to produce propylene based polymers and copolymers having various chain microstructures and specific stereochemistry. Depending on the choice of catalyst and reaction conditions, specific types of propylene polymers and copolymers, for example, can be purposely made to have narrow molecular weight distribution, statistically random comonomer incorporation, high fraction of atactic chain sequences and shorter crystallizable isotactic or syndiotactic chain sequences. Macroscopically, the polymers exhibit low melting point, low enthalpy of melting, low crystallinity, and low density and behave more similar to elastomers than to conventional polypropylene. Such polymers have various weight average molecular weights (Mw) ranging from 1000 g/mol to 1,000,000 g/mol, having a melting point between 20° C. to 150° C. which is well below the melting point 170° C. of iPP, having an enthalpy of melting between 0 J/g and 100 J/g and having a density between 0.85 g/cc and 0.90 g/cc, have been produced. Some of these polymers are well suited for hot melt adhesive applications.

The composition of the present invention comprises advantageously a blend of a semicrystalline LMW SSC-PP polymer and an essentially amorphous SSC-HMW PP polymer herein made with suitable single-site catalysts. The weight ratios of LMW PP polymer to HMW PP polymer in the blends ranges from 9:1 to 1:9 and the total amount of polymer blend in the composition of the present invention is from about 20%/o to about 80% by weight, preferably from about 30% to about 60% by weight, and most preferably from about 30% to about 50% by weight.

The semicrystalline LMW SSC-PP polymer (also referred to as PP-based polymer) in the hot melt adhesive composition of the present invention comprises either a homopolymer or a copolymer of propylene with at least one comonomer selected from the group consisting of ethylene and an alpha-olefin having a 4 to 8 carbon chain length, having from about 70% by weight to about 99% by weight, preferably having from about 80% by weight to about 98% by weight, and most preferably from about 85% by weight to about 98% by weight of propylene. The semicrystalline LMW SSC-PP polymer has a weight average molecular weight from about 10,000 g/mole to about 100,000 g/mole, preferably from about 10,000 g/mole to about 80,000 g/mole and most preferably from about 10,000 g/mole to about 60,000 g/mole, a melting point as measured by using DSC from about 20° C. to about 150° C., preferably from about 30° C. to about 110° C. and most preferably from about 40° C. to about 100° C., and having an enthalpy of melting as measured by using DSC from about 30 J/g to about 100 J/g, preferably from about 35 J/g to about 80 J/g and most preferably from about 35 J/g to about 60 J/g. These enthalpies of melting correspond to a degree of crystallinity, as calculated from the enthalpy of melting using 190 J/g for 100% crystalline isotactic PP, from about 18% to about 53% by weight, preferably from about 18% by weight to about 42% by weight, and most preferably from about 18% by weight to about 32% by weight. Further, the LMW SSC-PP polymers has a Brookfield viscosity at 190° C. ranging preferably from about 800 mPa·s to about 100,000 mPa·s and most preferably from about 1,000 mPa·s to about 20,000 mPa·s. In some embodiments, the semicrystalline LMW SSC-PP polymer has a weight average molecular weight from about 10,000 g/mole to about 30,000 g/mole, preferably from about 12,000 g/mole to about 29,000 g/mole and most preferably from about 15,000 g/mole to about 27,500 g/mole.

The essentially amorphous HMW SSC-PP polymer (also referred to as PP-based polymer) in the hot melt composition of the present invention is either a propylene hompolymer or propylene based copolymer with at least one comonomer selected from the group consisting of ethylene and an alpha-olefin having a 4 to 8 carbon chain length, having from about 70% by weight to about 99% by weight, preferably having from about 80% by weight to about 98% by weight, and most preferably from about 80% by weight to about 90% by weight of propylene. The HMW SSC-PP polymer has a weight average molecular weight higher than 100,000 g/mole, preferably from about 100,000 g/mole to about 1,000,000 g/mole and most preferably from about 100,000 g/mole to about 600,000 g/mole. Further, the HMW SSC-PP polymer is a predominantly amorphous material with either no DSC melting peak or having small residue crystallinity, exhibiting a DSC melting peak from about 20° C. to about 120° C., preferably from about 30° C. to about 100° C. and most preferably from about 40° C. to about 80° C., and having an enthalpy of melting as measured by using DSC from about 0 J/g to about 30 J/g, preferably from about 5 J/g to about 25 J/g and most preferably from about 5 J/g to about 20 J/g. These enthalpies of melting correspond to a degree of crystallinity, as calculated from the enthalpy of melting using 190 J/g for 100% crystalline isotactic PP, from about 0% to about 18% by weight, preferably from about 2.6% by weight to about 15.8% by weight, and most preferably from about 2.6% by weight to about 13.2% by weight. The HMW SSC-PP polymers have a melt flow rate (MFR) per ASTM D 1238 at 230° C./2.16 Kg test conditions of from about 1 g/10 min to about 200 g/10 min, preferably from about 10 g/10 min to about 60 g/10 min and most preferably from about 20 g/10 min to about 100 g/10 min. Preferably, the composition comprises no styrene content.

According to an embodiment of the invention, the molecular weight of the HMW PP polymer is at least double the molecular weight of the LMW SSC-PP. Preferably, the molecular weight of the HMW PP polymer is at least three times greater than the molecular weight of the LMW SSC-PP. More preferably, the molecular weight of the HMW PP polymer is at least five times greater than the molecular weight of the LMW SSC-PP. The molecular weight of the HMW PP polymer may be even at least eight or ten times greater than the molecular weight of the LMW SSC-PP. By utilizing two polymeric constituents with such molecular weight offsets with respect to any adhesive disclosed herein, it has been found that the purposes of the invention can be more easily achieved.

The compatible tackifying resins or tackifiers used in the hot melt adhesives of the present invention are those which extend adhesive properties and improve specific adhesion. As used herein, the term "tackifying resin" includes:

(a) aliphatic and cycloaliphatic petroleum hydrocarbon resins having Ring and Ball (R&B) softening points of from 10° C. to 150° C., as determined by ASTM method E28-58T, the later resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a $C_5$ olefin fraction of this type are Piccotac 95 tackifying resin sold by Eastman Chemicals and Escorez 1310LC sold by ExxonMobil Chemical Company and examples of hydrogenated cycloaliphatic petroleum hydrocarbon resins based on cyclopentadiene are Escorez 5400 from Exxonmobil and Resinall R1095S from Resinall Corporation;

(b) aromatic petroleum hydrocarbon resins and the hydrogenated derivatives thereof; an example of hydrogenated aromatic hydrocarbon resin is Arkon P-115 from Arakawa Chemicals;

(c) aliphatic/aromatic petroleum derived hydrocarbon resins and the hydrogenated derivatives thereof;

(d) aromatic modified cycloaliphatic resins and the hydrogenated derivatives thereof;

(e) polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) copolymers and terpolymers of natural terpenes, e.g. styrene/terpene, α-ethyl styrene/terpene and vinyl toluene/terpene;

(g) natural and modified rosin such as, for example, gum rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin; and (i) phenolic-modified terpene resins such as, for example, the resin product resulting from the condensation in an acidic medium of a terpene and a phenol.

Mixtures of two or more of the above described tackifying resins may be required for some formulations. Although a range of about 15% to about 75% by weight tackifying resin may be used, the preferred amount is from about 30% to about 60% by weight. Tackifying resins which are useful for the present invention can perhaps include polar tackifying resins. However, the choice of available polar tackifying resins is limited in view of the fact that many of the polar resins appear only partially compatible with polyolefins.

As noted above, tackifying resins which are useful within the scope of the present invention comprise about 15% to about 75% by weight, preferably about 30% to about 60% by weight, of the composition. Preferably, the tackifying resins can be selected from any of the nonpolar types, which are commercially available. Preferred resins are aliphatic petroleum hydrocarbon resins and most preferred are nonpolar products such as hydrogenated dicyclopentadiene (HDCPD) or aromatically modified derivatives thereof with softening points above 70° C. Examples of such resins are Escorez 5400 and Escorez 5600 sold by ExxonMobil Chemical company.

A plasticizer can be present in the composition of the present invention in amounts of about 1% to about 35% by weight, preferably from about 2% to about 20% by weight, in order to provide desired viscosity control and to impart flexibility. A suitable plasticizer may be selected from the group which includes the usual plasticizing oils, such as mineral oil, but also olefin oligomers and low molecular weight polymers, as well as vegetable and animal oils and derivatives thereof. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligmers may be polypropylenes, polybutenes, hydrogenated polyisoprenes, hydrogenated polybutadiens, or the like having average molecular weight between about 350 g/mole and about 10,000 g/mole. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that find usefulness in the present invention can be any number of different plasticizers but the inventors have discovered that mineral oil and liquid polybutenes having average molecular weight less than 5,000 g/mol are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive.

Waxes can be used to reduce the melt viscosity of the hot melt adhesive composition. Although amounts varying from about 0% to about 20% by weight may be used in the composition of the present invention, the preferred amounts are between about 0.1% to about 15% by weight, if used. In an embodiment, no wax is included in the adhesive composition. These waxes can also effect the set-up time and the softening point of the adhesive. Among the useful waxes are:

1. low molecular weight, that is, number average molecular weight (Mn) equal to 500-6000 g/mole, polyethylene having a hardness value, as determined by ASTM method D-1321, of from about 0.1 to 120, having an ASTM softening point of from about 65° C. to 140° C.;
2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials is commercially available from Westlake Chemical Corporation, Houston, Tex. under the tradename designation "Epolene" and from Honeywell Corporation, Morristown, N.J. under the trade name designation "A-C". The materials which are preferred for use in the composition of the present invention have a Ring and Ball softening point of from about 100° C. to 170° C. As should be understand, each of these wax diluents is solid the room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, are also useful with respect to functioning as a wax diluent equivalent. These hydrogenated materials are often referred to in the adhesive industry as "animal or vegetable waxes".

The present invention may include a stabilizer in an amount of from about 0.1% to about 3% by weight. Preferably from about 0.2% to 1% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxy-benzyl) benzene;

pentaerythirtol tetrakis-3(3,5-di-tert-butyl-4-hydroxyphenyl) propionate;

n-octadecyl-3(3,5-di-tert-butyl-4-hydroxyphenyl) propionate;

4,4'-methylenebis(4-methyl-6-tert butylphenol);

2,6-di-tert-butylphenol;

6-(4-hydroxyphenoxy)-2,4-bis(n-octylthio)-1,3,5-triazine;

2,3,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-3(3,5-di-tert-butyl-4-hydroxy-phenyl) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediaminetetraacitic acid, slats thereof, and disalicylalpropylenediimine.

It should be understood that other optional additives may be incorporated into the adhesive composition of the present invention in order to modify particular physical properties. These may include, for example, such materials as inert colorants e.g. titanium dioxide, fillers, fluorescent agents, UV absorbers, surfactants, other types of polymers, etc. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour. Surfactants are particularly important in hygienic disposable nonwoven because they can dramatically reduce the surface tension, for example, of the adhesive applied to diaper core, thereby permitting quicker transport and subsequent absorption of urine by the core.

The hot melt composition of the present invention is further characterized by having a low viscosity as measured per ASTM-D3236 by using Brookfied viscometer at 177° C. ranging from at 500 mPa·s to about 35,000 mPa·s, preferably from about 1,000 mPa·s to about 20,000 mPa·s and most preferably from about 2,000 mPa·s to about 15,000 mPa·s. Certain embodiments are essentially amorphous having no or little melting peaks on a DSC curve spanning a temperature range from −60° C. to 160° C. The DSC curves are obtained by using a DSC Model Q 1000 from TA Instrument and test method herein described later. Other embodiments are semicrystalline having a noticeable melting peak on a DSC curve in the same temperature range. Moreover, the composition has a R&B softening point from about 60° C. to about 120° C., most preferably from about 80° C. to about 110° C., per ASTM E-28 test methods by using glycerol as the medium with a Herzog automated tester, a density from about 0.85 g/cc to about 1.00 g/cc at 20° C. per ASTM D792-13.

The hot melt adhesive composition of the present invention may be formulated by using any of the mixing techniques known in the art. A representative example of the prior art mixing procedure involves placing all the components, except the polymers herein used in the present invention, in a jacketed mixing kettle equipped with a rotor, and thereafter raising the temperature of the mixture to a range from 150° C. to 200° C. to melt the contents. It should be understood that the precise temperature to be used in this step would depend on the melting points of the particular ingredients. First, the semicrystalline LMW PP polymer and then the essentially amorphous HMW PP polymer are subsequently introduced to the kettle under agitation and the mixing is allowed to continue until a consistent and uniform mixture is formed. The content of the kettle is protected with inert gas such as carbon dioxide or nitrogen during the entire mixing process. Without violating the spirit of the present invention, various additions and variation can be made to the present invention procedure to produce the hot melt composition, such as, for example, applying vacuum to facilitate the removal of entrapped air. Other equipment useful for formulating the composition of the present invention includes, but not limited to, single or twin screw extruders or other variations of extrusion machinery, kneaders, intensive mixers, Ross™ mixers and the like.

The adhesive composition of the present invention may be used as a general purpose hot melt adhesive in a number of applications such as, for example, in disposable nonwoven hygienic articles, paper converting, flexible packaging, wood working, carton and case sealing, labeling and other assembly applications. Particularly preferred applications include nonwoven disposable diaper and feminine sanitary napkin construction, diaper and adult incontinent brief elastic attachment, diaper and napkin core stabilization, diaper backsheet lamination, industrial filter material conversion, surgical gown and surgical drape assembly, etc.

The resulting hot melt adhesives may be then applied to substrates using a variety application technique. Examples includes hot melt glue gun, hot melt slot-die coating, hot melt wheel coating, hot melt roller coating, melt blown coating, spiral spray, contact or noncontact strand coatings branded as Omega™, Surewrap™, V-slot™ and Allegro™ methods and the like. In a preferred embodiment, the hot melt adhesive is directly applied onto elastic strands using the strand coating methods, which are a preferred technique for elastic attachment in diaper and adult incontinent article manufacturing. In one example, the hot melt composition of the present invention is coated using Allegro™ nozzle to form a continuous adhesive bond line on elastic strands used for elasticized legs, leg cuffs, and waistbands on baby diapers, training pants and adult incontinent articles. It is not the intent of this invention to provide a full description of various techniques and the details can be found in the literature or on nozzle manufacturer's websites www.nordson.com or www.itw.com.

In an embodiment of the invention, a method of making a laminate comprises the steps of: (1) applying the hot melt adhesive composition of the invention in a molten state to a primary substrate; and (2) mating a secondary substrate to the first substrate by contacting the secondary substrate with the adhesive composition. The primary substrate may be an elastic portion of a diaper, such as an elastic strand used as part of a leg cuff of a diaper. Such elastic strands (or bands) and their application as part of a leg cuff of a diaper are shown in U.S. Pat. No. 5,190,606, incorporated herein by reference. The secondary substrate may comprise a nonwoven material or a film, such as a spunbond/meltblown/spunbond (SMS) nonwoven fabric or polyethylene film, and the method may include folding the secondary substrate around the elastic strand. In this way, only the secondary substrate may serve as the substrate which encapsulates the strand or strands of the leg cuff. In an alternative embodiment, a tertiary substrate is used, and the secondary and tertiary substrates may be mated to the elastic strand on opposite sides of the elastic strand. In such an embodiment, the secondary substrate may be a polyethylene film and the tertiary substrate may be a film of nonwoven material, or verse visa. Furthermore, a composite diaper backsheet consisting of a polyolefin film joined to a nonwoven fabric can also be used as the secondary and tertiary substrates mentioned above.

In alternative embodiments of the invention, the adhesive is applied to the primary substrate using a direct contact method of hot melt application, such as a slot or V-slot applicator head. Alternatively, the adhesive may be applied to the primary substrate using a non-contact method of hot melt, such as a spray applicator. The primary substrate, to which the adhesive in a molten state is applied, may be an elastic strand or a nonwoven fabric. In embodiments in which the primary substrate is an elastic strand, the secondary substrate may be a nonwoven fabric wrapped around the elastic strand, or the secondary substrate could alternatively be elastic between two layers of nonwoven. In such embodiments, the laminate made by the method may be used as an elastic leg cuff, standing leg cuff, or elastic side panel in a disposable article, such as a diaper. In such embodiments, a tertiary substrate, such as a nonwoven fabric, may be used. Such a tertiary substrate may also have adhesive on it applied by either direct or non-contact methods. The laminate of such embodiments may be used as an elastic side panel or stretch ear on a disposable article.

In other embodiments in which the primary substrate is an elastic strand, the secondary substrate may be a polyethylene film and tertiary substrate, such as a nonwoven fabric, may be adhered to the film. In embodiments in which the primary substrate is a nonwoven fabric, the secondary substrate may be an elastic film. As shown by the examples below, compositions of the present invention give outstanding results, when applied to an elastic strand, in creep tests which simulate the performance requirements in industry.

EXAMPLES

Brookfield viscosity is tested according to ASTM D-3236 Method at 163° C. (325° F.).

Ring & Ball softening point is determined in glycerol with an automated Herzog unit according to ASTM E-28 method.

Solid density is measurement according to ASTM D792-13 at 23° C.

Differential Scanning Calorimetry (DSC) test is run with a heat-quench-heat program on a DSC Model Q 1000 from TA Instrument. Preferably, a sample of about 10 mg in size is sealed in an aluminum DSC sample pan. The pan is placed in the instrument sample chamber and heated at 20° C./min heating rate from the ambient temperature to 200° C., from which the sample is quickly quenched to −110° C. The temperature is then ramped up to 200° C. at the 20° C./min heating rate and the data is collected. The enthalpy of melting (ΔH) measured in Joules per gram (J/g) is calculated from the area of the melting peak on the DSC curve using the application software package installed in Model Q 1000 DSC. For the purpose of the present invention, the melting point is defined as the temperature corresponding to the melting peak maximum, i.e., the highest point on the melting peak.

Specimens for creep test are prepared using a customized coater/laminator equipped with a Nordson™ Zero-Cavity hot melt coating module which is designed to accommodate Surewrap™, Allegro™ and slot die tips. For the present invention, an Allegro™ tip is used to apply the present composition directly to Investa™ elastic strands having 680 Decitex (dtex) fineness. The tip has three separate adhesive nozzles or orifices of 5 mm apart capable of coating three elastic strands simultaneously.

As used herein, decitex (abbreviated dtex) refers to the mass in grams per 10,000 meters of fiber length. It is a measure of fiber fineness in textile industry.

Shear adhesion test is measured in an incubator oven at 37.8° C. (100° F.) per a modified ASTM D6463 procedure. Specifically, the test specimen used is prepared by using a laminate of the present hot melt adhesive between a pair of identical SMS nonwovens webs, the preparation of which is fully disclosed hereafter in Examples 1-5. The laminate is cut in the cross direction into one inch wide strip to form the test specimen. Prior to the test, the specimens were conditioned at the ambient environment for approximately 12-24 hours to ensure the reproducibility and accuracy of the data. The average shear adhesion value of three replicates, reported in minutes, is defined as shear strength.

Creep Resistance test was carried out with laminated specimens as described in Examples 1-5. The laminated specimens comprise an elastic strand and non-elastic substrates. A segment of the laminated specimen about 350 mm is stretched completely and is securely attached to a piece of rigid Polyglass board. A length of 300 mm is marked and the elastic strands are cut at the marks while the non-elastic substrates are maintained in the stretched configuration. The specimen is then placed in an air-circulating oven at 37.8° C. (100° F.). Under these conditions, the elastic strands under stretch can retract to a certain distance. The distance between the ends of the elastic strands is measured after four hours. The ratio of the final length to the initial length, defined as Creep Retention and expressed in percentage (%), is a measure of the ability of the adhesive to hold the elastic strands.

Vistamaxx 6202, obtained from Exxonmobil Chemical Company, Houston, Tex., is an essentially amorphous HMW SSC-PP copolymer containing about 15% by weight of ethylene comonomer and having a weight average molecular weight (Mw) of about 144,700 g/mol, a DSC melting point of about 101° C., a DSC melt enthalpy of about 11.4 J/g, a density of about 0.863 g/cc at 23° C. per ASTM D1505 and a melt flow rate (MFR) of about 9.1 g/10 min per ASTM D1238 at 230° C./2.16 kg test conditions.

Vistamaxx 6502, obtained from Exxonmobil Chemical Company, Houston, Tex., is an essentially amorphous HMW SSC-PP copolymer containing about 13% by weight of ethylene comonomer and having a weight average molecular weight (Mw) of about 119,000 g/mol, a DSC melting point of about 64° C., a DSC melt enthalpy of about 9 J/g, a density of about 0.865 g/cc at 23° C. per ASTM D1505 and a melt flow rate (MFR) of about 48 g/10 min per ASTM D1238 at 230 C/2.16 kg test conditions.

Vistamaxx 8880, also obtained from Exxonmobil Chemical Company, is a semicrystalline LMW SSC-PP copolymer consisting of about 5.2% by weight of ethylene comonomer and having a weight average molecular weight (Mw) of about 27,000 g/mol, a DSC melting point of about 96° C., a DSC melt enthalpy of about 38 J/g, a density of about 0.880 g/cc at 20° C. per ASTM D1505 and Brookfield viscosity of about 1,200 mPa·s per ASTM D3236 at 190° C.

Licocene 1602, purchased from Clariant, Holden, Mass., is an essentially amorphous LMW SSC-PP copolymer consisting of about 10% by weight of ethylene comonomer and having a weight average molecular weight (Mw) of about 20,900 g/mol, a DSC melting point of 66° C., a DSC melt enthalpy of 20.2 J/g, a density of about 0.870 g/cc at 23° C. per supplies ISO 1183 test method and Brookfield viscosity of about 5,000-7,000 mPa·s per DIN 53019 test method at 170° C.

Polypropylene LX5 02-15, obtained from Total Petrochemicals USA, Inc, Houston, Tex., is a semicrystalline HMW SSC-PP copolymer containing about 2% by weight of ethylene comonomer and having a weight average molecular weight (Mw) of about 150,000 g/mol, a DSC melting point of 119° C., a DSC melt enthalpy of about 60 J/g, a density of about 0.895 g/cc at 23° C. per ASTM D1505 and a melt flow rate (MFR) of about 12 g/10 min per ASTM D1238 at 230° C./2.16 kg test conditions.

Escorez 5415, purchased from ExxonMobil, is a very light color, hydrogenated cycloaliphatic hydrocarbon tackifier having an R&B softening point of about 115° C.

Resinall R1095S is a hydrogenated cycloaliphatic hydrocarbon resin having a R&B softening point of about 100° C. It is obtained from Resinall Corporation in Severn, N.C.

Arkon P-125 is a hydrogenated C9 hydrocarbon resin having a R&B softening point of about 125° C. It is purchased from Arakawa (USA) Inc, Chicago, Ill.

Nyflex 222B is a mineral oil plasticizer purchased from Nynas USA Inc., Houston, Tex.

AC-596P is a maleic anhydride modified PE wax having a viscosity of about 150 mPa·s at 190° C., a density of 0.93 g/cc and a drop point of 141° C. It is obtained from Honeywell Corporation, Morristown, N.J.

Clopay DH284 PE is a LDPE film of 20 gram per square meter (gms) basis weight purchased from Clopay Plastic Product Co., Inc., Mason, Ohio.

SQN SB 15 gsm is a spunbond nonwoven fabric purchased from First Quality Nonwovens Inc., McElhattan, Pa.

Kaydol oil is a white mineral oil purchased from Sonneborn Inc., Parsippany, N.J.

Eastotack H100L is a partially hydrogenated $C_5$ resin having a R&B softening point about 100° C. purchased from Eastman Chemical Company, Kingsport, Tenn.

Irganox 1010 is a hindered phenol antioxidant purchased from BASF Corporation, Florham, N.J.

The invention is further illustrated by way of the examples which are set forth below.

Examples 1-5

The hot melt adhesives of examples 1-5 shown by weight percent in Table 1 are prepared with the ingredients and mixing procedures described herein above. A total of 2500 grams each are made and the mixing is carried out at 177° C. under nitrogen atmosphere in a laboratory type of mixer that consists of a propeller powered by a motor, a heating mantle, a temperature control unit, and a container of about 1 gallon in size. The appropriate amounts of each component, calculated according to the ratios shown in the table, except the SSC-PP polymers, are added to the container. The temperature of the container is then raised to melt the content. After the ingredients in the container are completely melted, the motor is turned on to start agitation. The semicrystalline LMW SSC-PP polymer component is next introduced, which is followed by the essentially amorphous HMW SSC-PP polymer. Mixing is allowed to continue until the polymers are completely dissolved and a uniform mixture is formed. The adhesive examples 1-5 exhibit high cohesive strength, excellent creep resistance, have a viscosity suitable for processing and application on a range of substrates, and are especially useful for a number of applications in nonwovens hygiene articles where high creep retention and high shear are needed, which include, but not limited to, elastic attachment, landing zone attachment, stretch panel attachment, fastener attachment and the like.

TABLE 1

| | Examples 1-5 | | | | |
| --- | --- | --- | --- | --- | --- |
| | EX-1 | EX-2 | EX-3 | EX-4 | EX-5 |
| Kaydol Oil | 5.00 | 10.00 | | | |
| Nyflex 222B | | | 8.24 | 12.82 | 6.50 |
| Eastotack H100L | 54.50 | 50.00 | | | |
| Resinall R1095S | | | 50.78 | 51.68 | 58.00 |
| Vistamaxx 8880 | 25.00 | 24.50 | 25.00 | 15.28 | 20.00 |
| Vistamaxx 6202 | 15.00 | 15.00 | | | |
| Vistamaxx 6502 | | | 15.48 | 19.72 | 15.00 |
| Irganox 1010 | 0.50 | 0.50 | 0.50 | 0.50 | 0.50 |
| Total | 100.00 | 100.00 | 100.00 | 100.00 | 100.00 |
| Viscosity (mPa · s) @ 162.8° C. | 10,720 | 13,750 | 4880 | 6600 | 4900 |
| R&B Softening Point (° C.) | 94 | 93 | 89 | 86 | 88 |
| Density (g/cc) | 0.96 | 0.95 | 0.95 | 0.95 | 0.95 |
| Enthalpy of Melting (J/g) | 1.9 | 0.4 | none | 0.5 | 0.6 |
| Creep Retention (%) at 35 mg/s/m | 94 | 80 | 94 | 91 | 95 |
| Shear (min) at 50 gsm | >1440 | >1440 | >1440 | >1440 | >1440 |

Brookfield Viscosity, R&B Softening Point, density, melting point, melting enthalpy, shear adhesion, and Creep Retention tests are carried out on Examples 1-5 according to the test methods herein described above. The room temperature tack is judged by the adhesive's stickiness to human fingers. Specimens for Creep Retention test are prepared by using Allegro™ single strand coating technique on a customized hot melt coater which is equipped with a Nordson Zero Cavity™ coating module fitted with an Allegro™ nozzle. Three elastic strands (Investa 680), stretched to 300% elongation, are each individually coated at about 148° C. to about 163° C. coating temperature. In these coating trials, the elastic strand entrance angle to the nozzle guide (i.e., the angle between a line normal to the axis of the applicator and the elastic strand extending between the nozzle and the guide or roller closest to the nozzle on the inlet side) was kept between 2 and 5°. The applicator angle to the exit strand plane was approximately 87°. (Note the parameters described above are described using conventions employed by nozzle manufacturer in, "Universal Allegro Elastic Coating Nozzles Customer Product Manual, Part 1120705_01" Issued February 2015). In addition, the angle defined by a line normal to the axis of the applicator and the elastic strand extending between the nozzle and the guide or roller closest to the nozzle on the outlet side was approximately 3°. Thus, the applicator was in its standard position, aligned vertically. The adhesives are applied at about 300 meter/minute line speed, 35 milligrams per strand per meter (mg/s/m) add-on, 0.25 seconds open time and 40 psi compression at the nip rolls. The coated strands are then laminated between a polyethylene film (Clopay DH284 PE) and a polypropylene spunbond nonwovens fabric (SQN SB 15) to form an elastic laminate.

Specimens for shear adhesion test are prepared on a Model LH-1 bench-top coater equipped with a one inch slot die nozzle. The adhesives are coated onto a first SMS nonwoven web at 300° F., 50 grams per square meter (gsm) add-on. The coated first SMS web is then laminated to the same second SMS web with 0.25 seconds open time in such a fashion that the resulting laminate has a one inch bonded width and one inch non-bonded width on each side. The laminate is conditioned for 12-24 hours at ambient conditions before a shear test is carried out.

Comparative Examples 6-9

Comparative Examples of 6-9 are formulated similarly with the components listed in Table 2 by using the same procedure as herein described above. Different from Examples 1-5, Examples 6-9 contain either a single SSC-PP polymer or with a blend having two essentially amorphous LMW SSC-PP polymers, opposite the essentially amorphous HMW SSC-PP polymers of Examples 1-5. EX-6 uses an essentially amorphous, but LMW SSC-PP polymer Licocene 1602 with a residue enthalpy of melting of about 20 g/J. EX-7 is formulated with a polymer blend consisting of the semicrystalline LMW SSC-PP polymer Vistamaxx 8880 and essentially amorphous LMW SSC-PP Licocene 1602. EX-8 solely contains Vistamaxx 8880 and EX-9, Vistamaxx 6502. Viscosity, softening point, density, melting point, melting enthalpy and creep retention are obtained by using the same test methods as described herein for Examples 1-5. It is apparent that Examples 6-9 exhibit either poor creep retention as demonstrated in EX-6 and 7, or delamination as shown in EX-8, or too high a viscosity to be coated (Example 9). They lack the balanced properties of Examples 1-5.

TABLE 2

Comparative Examples 6-9

| | Wt % | | | |
| --- | --- | --- | --- | --- |
| | EX-6 | EX-7 | EX-8 | EX-9 |
| Nyflex 222B | 5.00 | 5.00 | 5.00 | 10.00 |
| Resinall R1095S | 55.42 | 55.42 | 55.42 | 50.42 |
| Licocene 1602 | 39.08 | 20.72 | | |
| Vistamaxx 8880 | | 18.36 | 39.08 | |
| Vistamaxx 6502 | | | | 39.08 |
| Irganox 1010 | 0.50 | 0.50 | 0.50 | 0.50 |
| Total | 100.00 | 100.00 | 100.00 | 100.00 |
| Viscosity (mPa · s) @ 162.8° C. | 1,340 | 875 | 540 | 54,400 |
| R&B (° C.) Softening Point | 68 | 83 | 89 | 85 |
| Density (g/cc) | 0.95 | 0.95 | 0.96 | 0.95 |
| Creep (%), at 35 mg/s/m | 37 | 50 | Delamination | high vis. |

Example-10

The adhesive in Example 10 is prepared by using the same procedure herein described above and ingredients consisting of 45.0% by weight Vistamaxx 8880, 10.0% by weight Vistamaxx 6502, 5.0% by weight Nyflex 222B mineral oil, 29.5% by weight Escorez 5400 tackifier and 0.5% by weight antioxidant. The adhesive sample has a Brookfield Viscosity of 3,310 mPa·s at 177° C. (350° F.) and a softening point of 108° C. It is characterized by having low viscosity, therefore low application temperature, and excellent room temperature and low temperature bond strength to varnished/printed or coated cardboard and is particularly useful for case and carton sealing applications. Specimens for bond strength test are prepared by using 4 inch×1 inch printed paperboard strips as the substrate. The adhesive of Example 10 is applied using a hand-held Mini-Squirt™ glue gun in the form of a bead of about 3 mm in diameter on the printed side of a first substrate strip, and a second substrate strip is immediately brought into contact and pressed against the first. The room temperature bond strength test is performed by hand-peel after about four hour conditioning at the ambient conditions. The low temperature bond strength test is conducted similarly at about −25° C. in a freezer. Three replicates for each temperature are tested and all the specimens exhibit fiber-tear bond strength both at the room temperature and the low temperature.

Comparative Examples 11 and 12

Two comparative examples that consisted of a polymer blend having a semicrystalline HMW SSC-PP in combination with an essentially amorphous LMW SSC-PP were tested. This blend is opposite to compositions of the patent application, in which the HMW SSC-PP is essentially amorphous and the LMW SSC-PP polymer is semicrystalline.

The data and results are shown below in Table 3. The following materials not identified previously were used:

Versify 3000, obtained from the Dow Chemical Company, Midland, Mich., is a semicrystalline HMW SSC-PP copolymer containing about 5% by weight of ethylene comonomer and having a DSC melting point of about 115° C., a DSC melt enthalpy of about 59 J/g, a density of about 0.8888 g/cc at 23° C. per ASTM D1505, a weight average molecular weight of 227,000 and a melt flow rate (MFR) of about 8 g/10 min per ASTM D1238 at 230° C./2.16 kg test conditions.

Sucorez 210 is a hydrogenated cyclo aliphatic hydrocarbon resin having a R&B softening point of about 110° C. It is purchased from Kolon USA Inc., Atlanta, Ga.

Vistamaxx EXP 150, obtained from Exxonmobil Chemical Company, is an essentially amorphous LMW SSC-PP copolymer consisting of about 13% by weight of ethylene and having a weight average molecular weight (Mw) of about 39,200 g/mol, a DSC melting point of about 101° C., a DSC melt enthalpy of about 16 J/g, a density of about 0.870 g/cc at 20° C. per ASTM D1505 and Brookfield viscosity of about 8000 mPa·s per Exxonmobil at 190° C.

TABLE 3

| | Comp-10 | Comp-11 |
| --- | --- | --- |
| Kaydol oil | 15.00 | |
| Nyflex 222B | | 8.00 |
| Eastotack H100L | 50.00 | |
| Surorez 210 | | 54.50 |
| Versify 3000 | | 12.00 |
| LX02-15 | 10.00 | |
| Vistamaxx EXP 150 | 24.50 | 25.00 |
| Irganox 1010 | 0.50 | 0.50 |
| Total | 100 | 100 |
| Vis (cPs) 162.8° C. | 7,610 | 16300 |
| SP (° C.) | 116 | 111 |
| Creep, initial | 71 | 76 |

These comparative examples provided a creep rating significantly worse than compositions of the present invention.

Examples 13-16

Additional examples were prepared having from 22% by weight to 28% by weight of the essentially amorphous HMW SSC-PP copolymer, Vistamaxx 6502. The formulations and properties are listed in the table below. All the examples show a viscosity well within acceptable range for processing and excellent creep performance with creep retention over 97%.

TABLE 4

| | % by weight ingredients | | | |
|---|---|---|---|---|
| | EX-13 | EX-14 | EX-15 | EX-16 |
| Nyplast 222B | 8.0 | 5.0 | 8.0 | 10.0 |
| Resinall R1095S | 53.5 | 53.5 | | |
| Escorez 5415 | | | 51.5 | 54.5 |
| Vistamaxx 8880 | 16.0 | 16.0 | 15.0 | 7.0 |
| Vistamaxx 6502 | 22.0 | 25.0 | 25.0 | 28.0 |
| Irganox 1010 | 0.5 | 0.5 | 0.5 | 0.5 |
| Total | 100.0 | 100.0 | 100.0 | 100.0 |
| Viscosity (mPa · s) @ 162.8° C. | 10750 | 18700 | 15620 | 25600 |
| R&B Softening Point (° C.) | 88 | 88 | 87 | 87 |
| Density (g/cc) | 0.95 | 0.95 | 0.95 | 0.95 |
| Enthalpy of Melting (J/g) | None | None | None | None |
| Creep Retention (%) at 35 mg/s/m | 97 | 98 | 98 | 97 |

Example 17

The heat stability of Examples 1-5 and 13-16 was also tested according to the procedure described below. A sample of 150 grams was transferred to an 8 oz glass jar. The jar was then capped with a cap having the paper lining removed. The jar was then placed in an air-circulating oven at 177° C. A sample was then taken at 24 hour intervals and viscosity was measured at 162.8° C. At the same time, the visual appearance of the sample was also inspected and recorded for the formation of char, gel, skin, and phase separation or the lack of them. The viscosity and the inspection results at 96 hours were produced in the tables below:

TABLE 5

| | EX-1 | EX-2 | EX-3 | EX-4 | EX-5 |
|---|---|---|---|---|---|
| Char | None | None | None | None | None |
| Gel | None | None | None | None | None |
| Skin | None | None | None | None | None |
| Phasing | None | None | None | None | None |
| Viscosity (mPa · s) @ 162.8° C., 24 hrs. | 10,720 | 13,750 | 4880 | 6600 | 4900 |
| 48 hrs | 10,630 | 12,560 | 4820 | 6560 | 4950 |
| 72 hrs | 10,690 | 12,410 | 4830 | 6570 | 4870 |
| 96 hrs | 10,490 | 12,200 | 4800 | 6540 | 4790 |

| | EX-13 | EX-14 | EX-15 | EX-16 |
|---|---|---|---|---|
| Char | None | None | None | None |
| Gel | None | None | None | None |
| Skin | None | None | None | None |
| Phasing | None | None | None | None |
| Vis (cPs)/162.8° C., 24 hrs | 10,580 | 18,470 | 15,160 | 24,950 |
| 48 hrs | 10,870 | 18,000 | 15,250 | 24,300 |
| 72 hrs | 10,300 | 17,600 | 14,720 | 23,450 |
| 96 hrs | 10,150 | 17,390 | 14,420 | 23,090 |

As can be seen, the compositions of the present invention are heat stable. None of the samples of the present invention had a viscosity which dropped by more than 10% over 96 hours. Moreover, none of the samples of the present invention showed any evidence of char, gel, skin, and phase separation.

Where a range of values is provided, it is understood that each intervening value, and any combination or sub-combination of intervening values, between the upper and lower limit of that range and any other stated or intervening value in that stated range, is encompassed within the range of values recited. In addition, the invention includes a range of a constituent which is the lower limit of a first range and an upper limit of a second range of that constituent.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue or prior invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A laminate comprising a primary substrate and a secondary substrate mated with the primary substrate through contact with a hot melt adhesive, wherein the hot melt adhesive comprises:
   (a) a polymer blend containing at least one semicrystalline LMW SSC-PP polymer and at least one essentially amorphous HMW SSC-PP copolymer; both of which are either homopolypropylene or copolymers of propylene with an α-olefin comonomer prepared by using SSC catalysts; the weight ratio of the LMW SSC-PP polymer to the HMW SSC-PP polymer in the blends ranges from 9:1 to 1:9 and the total amount of the polymer blend in the composition of the present invention is from about 20% to about 80% by weight; the LMW SSC-PP having a weight average molecular weight from about 10,000 g/mole to about 100,000 g/mole, a crystallinity of about 18% to about 50%, and a Brookfield viscosity at 190° C. ranging from about 800 mPa·s to about 100,000 mPa·s; and the HMW SSC-PP polymer a weight average molecular weight greater than 100,000 g/mole, and a crystallinity of about 0% to about 18%, wherein the molecular weight of the HMW PP polymer is at least double the molecular weight of the LMW SSC-PP;
   (b) a compatible tackifier in the amount of about 15% by weight to about 75% by weight;
   (c) about 1% to about 35% by weight of a plasticizer;
   (d) about 0.1% to about 3% by weight of a stabilizer or antioxidant; and
   (e) optionally about 0% to about 20% by weight of a wax.

2. The laminate of claim 1, where the primary substrate is an elastic strand.

3. The laminate of claim 1, wherein the primary substrate is a nonwoven fabric.

4. The laminate of claim 2, wherein the secondary substrate is a nonwoven fabric wrapped around the elastic strand.

5. The laminate of claim 2, wherein the secondary substrate is a polyethylene film and a tertiary substrate is a nonwoven fabric.

6. The laminate of claim 3, wherein the secondary substrate is an elastic film.

7. The laminate of claim 1 used as an elastic leg cuff, standing leg cuff or elastic side panel in a disposable article.

8. The laminate of claim 7 used as an elastic leg cuff.

9. The laminate of claim 7 used as an elastic side panel.

10. The laminate of claim 1 used as a stretch ear on a disposable article.

11. A disposable article comprising the laminate of claim 1.

12. A disposable article, wherein the article is selected from the group consisting of a diaper, feminine sanitary napkin, and an adult incontinent article.

13. A disposable article, wherein the article is a diaper.

* * * * *